US005786682A

United States Patent [19]

Aiken et al.

[11] Patent Number: 5,786,682

[45] Date of Patent: Jul. 28, 1998

[54] BATTERY CHARGING CIRCUIT INCLUDING A CURRENT LIMITER WHICH COMPARES A REFERENCE CURRENT TO A CHARGING CURRENT TO ENSURE OPERATION OF A LOAD

[75] Inventors: Merle R. Aiken, South Amherst; Brian D. Goodlive, Cleveland; James A. Giancaterino, Sheffield Lake, all of Ohio

[73] Assignee: Reltec Corporation, Lorain, Ohio

[21] Appl. No.: 691,038

[22] Filed: Aug. 7, 1996

[51] Int. Cl.[6] .......... H01M 10/46

[52] U.S. Cl. .......... 320/6; 320/15; 320/56; 307/66

[58] Field of Search .......... 320/5, 6, 15, 9, 320/14, 27, 30, 35, 39, 78, 56; 307/66, 44, 46, 64

[56] References Cited

U.S. PATENT DOCUMENTS

| | | | |
|---|---|---|---|
| 3,665,495 | 5/1972 | Carter et al. | 307/67 |
| 3,683,198 | 8/1972 | Thode | 307/66 |
| 4,065,676 | 12/1977 | Elias | 307/66 |
| 4,164,698 | 8/1979 | Kleeberg | 320/2 |
| 4,399,396 | 8/1983 | Hase | 320/43 |
| 4,467,265 | 8/1984 | Hierholzer, Jr. | 320/17 |
| 4,897,591 | 1/1990 | Spani | 320/39 X |
| 5,184,025 | 2/1993 | McCurry et al. | 307/66 |
| 5,187,425 | 2/1993 | Tanikawa | 320/35 X |
| 5,254,931 | 10/1993 | Martensson | 320/22 |

*Primary Examiner*—Edward Tso

*Attorney, Agent, or Firm*—Fay, Sharpe, Beall, Fagan, Minnich & McKee

[57] ABSTRACT

In a system including a power supply, such as a rectifier, which supplies power to a load and in which a back-up battery is arranged between the power supply and load, a current controller is configured to control the recharging current supplied to the back-up battery. The current controller includes a variable resistance which is altered dependent upon whether more or less current is to be used for recharging of the back-up battery. The use of the current controller ensures that sufficient current is available for the load during the recharging process, even in a situation where the back-up battery requires a high level of recharging.

22 Claims, 3 Drawing Sheets

BATTERY CHARGING CIRCUIT INCLUDING A CURRENT LIMITER WHICH COMPARES A REFERENCE CURRENT TO A CHARGING CURRENT TO ENSURE OPERATION OF A LOAD

BACKGROUND OF THE INVENTION

This invention pertains to the art of battery chargers and more particularly to controlling battery recharging current.

The invention finds particular application in back-up battery installations used in communication systems and especially in telecommunication based systems. It will be appreciated, however, that the invention has broader applications and may be advantageously employed in other environments that require controlling the current used in recharging back-up batteries.

Telecommunication and other communication systems are commonly powered by a rectifier which includes back-up batteries maintained in a float condition between the rectifier and the load during normal operation.

It is recognized that due to problems within rectifiers or to external events, rectifiers will at times shut down or operate at less than full output. When a rectifier enters a shut down or reduced operation state, back-up batteries are used to supplement the energy needs of the communication system. Batteries previously charged to a predetermined voltage level discharge into the load to maintain operation at a desired level. Upon returning to normal operation the rectifier again acts to supply power to the load, removing the need for power supplied by the back-up batteries. During the time the back-up batteries supply the load they are discharging the power which has been stored within their cells, thereby lowering their voltage levels. Therefore, it is necessary to recharge the back-up batteries to a fully charged level.

Commonly, the back-up batteries are recharged through the use of the rectifier. When the rectifier operates in a normal state, current is supplied not only to the load but is also used to recharge the back-up batteries.

In existing systems when the rectifier has completely shut down or operated at a lowered output for an extended amount of time, the back-up batteries will have discharged to a low level, and once the rectifier returns to full operation the back-up batteries will tend to draw high amounts of current in order to recharge as quickly as possible. This fast recharge tendency has several drawbacks including causing the back-up batteries to overheat to a point that they can, under certain conditions, enter a thermal runaway condition resulting in the destruction of the batteries.

Therefore, it has been deemed desirable to find a manner of limiting the recharging current supplied to back-up batteries once the rectifier returns to full output operation. Further, current limiting is beneficial as it allows immediate activation of the system once the rectifier is again operational. Still further, the current limiting should be easily integrated into back-up battery power systems and be economical to use.

SUMMARY OF THE INVENTION

The present invention provides a new and improved battery back-up system with current limiting for the recharging of back-up batteries, which allows immediate operation of a communication load upon a rectifier moving from an inactive or lowered state of operation to a full operation state.

According to a more limited aspect of the invention, the current limiting system includes a sensing device for the back-up batteries used in a feedback control system to control the amount of current supplied by the rectifier to the back-up batteries.

According to yet another aspect of the invention, the current limiting device of the subject invention is adjustable for different sized batteries having different recharging current requirements.

According to still a further aspect of the invention, the current limiting device is provided with a main current shutdown that can be applied externally to the device.

According to still yet another aspect of the invention, a string of back-up batteries are monitored by a midpoint monitoring system.

A principal advantage of the invention is providing a current limiting device which allows recharging of a back-up battery systems while also allowing immediate operation of the communication system it is powering when the communication system changes from an inoperative state to an active state.

Another advantage of the invention resides in provision of a current limiting device which meets both operative and dimensional constraints for selected uses, such as in power supply communication systems employing back-up battery configurations.

Still another advantage of the invention is realized in its adjustability for use with different power requirements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
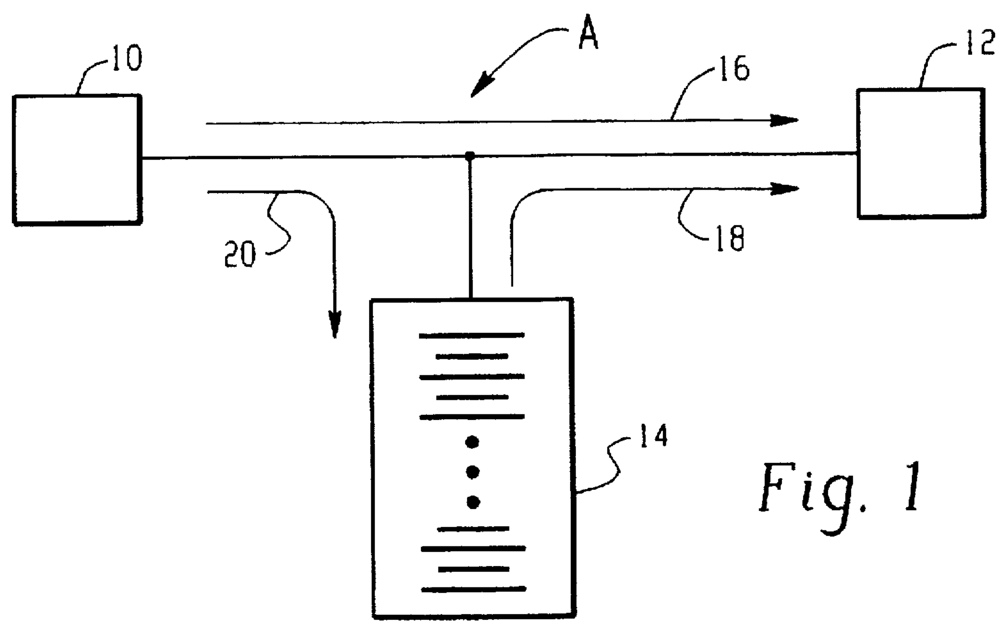
FIG. 1 is a block diagram of a communication system powered by a rectifier including back-up batteries.

Referring now to the drawings wherein the showings are for purposes of illustrating the preferred embodiment of the invention only and not for purposes of limiting same, FIG. 1 illustrates a communication power supply system A including a power supply such as rectifier 10 supplying a load such as telecommunications load 12. Also included is a back-up battery configuration 14 used to supply telecommunication load 12 when rectifier 10 enters a shutdown or low operation state. For purposes of this discussion rectifier 10 is considered to have a maximum output of 100 amps, telecommunication load draws a maximum of 25 amps at an operating voltage of 54 volts and back-up battery configuration 14 is fully charged.

When rectifier 10 is operating in a normal active state, it has the capability of supplying the load requirements of telecommunication load 12. During this time back-up battery configuration 14 is in a float condition, and rectifier 10 supplies load 12 through path 16. When rectifier 10 enters a shutdown or low operation state such that it is not able to fully supply load 12, back-up battery configuration 14 functions to supply load 12 via path 18. For example, if rectifier 12 can only supply 15 amps of the 25 amps required by load 12, back-up battery configuration 14 is used to supply the remaining 10 amps. Similarly, if rectifier 10 enters a complete shutdown state then the full 25 amps is supplied by back-up battery configuration 14.

Assuming back-up battery configuration 14 is capable of supplying 200 amp/hours of energy, then when completely charged, it can supply load 12 for four hours, i.e. 25 amps×4 hours=200 amp/hours. Should rectifier 10 be in shutdown state for longer than the time period which back-up battery configuration 14 can supply load 12 then the entire communication system will shutdown.

Once rectifier 10 moves back to an operational state, back-up battery configuration 14 draws current through path 20 in order to recharge to a fully charged level. In such a situation, back-up battery configuration 14 attempts to draw as much current as possible from rectifier 10 in order to recharge itself in a short time period. This fast recharging can result in current being drawn at such a level that undesirable heating takes place leading to damage of the battery cells of configuration 14.

Figure 2:
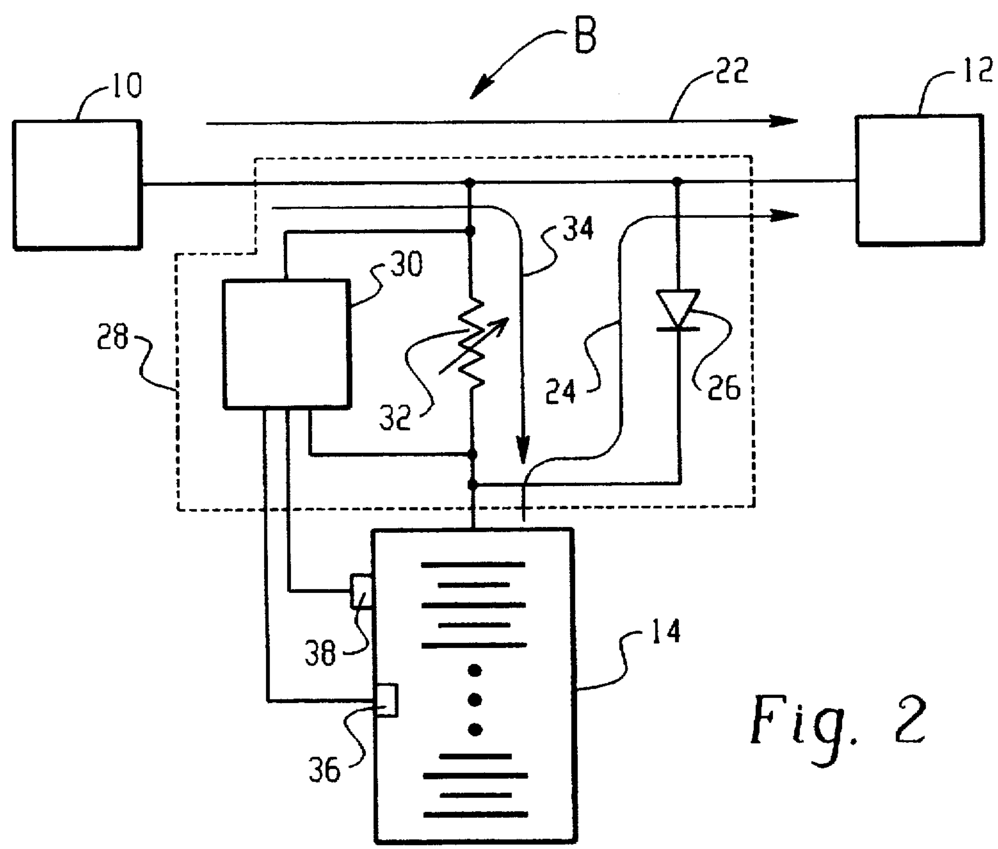
FIG. 2 is a block diagram of a telecommunication system supplied by a rectifier with a back-up battery system controlled by a current limiter according to the teachings of the subject invention; and, FIG. 3 provides a more detailed illustration of the current control system of FIG. 2.

In consideration of the above, the system of FIG. 2, has been constructed to include current limiting of the recharging current for back-up battery configuration 14. In communication system B disclosed in FIG. 2, during normal operation rectifier 10 supplies the required current to load 12 through path 22. When rectifier 10 enters a shutdown or lowered operation state, back-up battery configuration 14 supplies load 12 through path 24.

FIG. 2 illustrates a positive ground system so that reverse diode 26 provides the path through which supplementing current from back-up battery configuration 14 is provided to load 12. When rectifier 10 is again operational, the system works to recharge back-up battery configuration 14. Control system 28, including current controller 30 and variable resistance 32, is used to control the current which is being drawn by back-up battery configuration 14 during the recharging process. Current flows in path 34 through variable resistor 32 into the positive end of back-up battery configuration 14. Current controller 30 senses the amount of current flowing through path 34 and alters variable resistance 32 to adjust current flow to predetermined acceptable levels.

As previously noted, one reason the recharging current is controlled is to avoid overheating of the battery cells. Particularly, batteries have ampere-hour ratings, i.e. C/n, where n equals the time for recharging without damaging the battery and C is the charge capacity of the battery. Thus, if it is determined that recharging current flowing through path 34 should be limited to 10 amps then variable resistance 34 is adjusted by current controller 30 to limit the amount of current supplied to back-up battery configuration 14. By this arrangement a value for the recharging current is set where back-up battery configuration 14 is not damaged due to excessive thermal heating, and where the load requirements of load 12 are met immediately upon reactivation of rectifier 10 such that communication system B is operational substantially immediately upon full activation of rectifier 10.

To provide further monitoring of back-up battery configuration 14, a midpoint monitoring system is used by current controller 30. Midpoint sensor 36 is placed in an operational position with back-up battery configuration 14, which in the subject embodiment is constructed of a plurality of battery cells. For example, back-up battery configuration 14 may be constructed of twenty-four two volt cells for a total voltage of 48 volts. Midpoint sensor 36 is located at the electrical midpoint of configuration 14 and the output of midpoint sensor 36 is sent back to current controller 30. By this arrangement, if a cell on either side of midpoint sensor 36 functions inappropriately, the balance sensed by midpoint sensor 36 is disturbed thereby indicating a problem in the cells. If such a situation exists, the information is provided to current controller 30 which in turn issues a warning alarm indicating the cells need to be checked. Current controller 30, which receives sensor information from mid-point sensor 36, is arranged to allow a predetermined amount of difference between the two halves of the back-up battery configuration 14 such that slight variations do not cause the triggering of an alarm ensuring only those deviations from a balanced position outside a known bandwidth operate to trigger the alarm.

Current controller 30 also monitors remote shutdown sensor 38 placed in operational association with back-up battery configuration 14. The remote shutdown sensor 38 may in the present embodiment be a thermal remote shutdown sensor, though it is to be appreciated that other types of sensors may be used. Remote shutdown sensor 38 operates in conjunction with current controller 30 to shutdown all current flow of the communication system B when a potentially catastrophic failure is sensed. Particularly, if the current supplied for recharging of back-up battery configuration 14 causes the temperature to rise at an undesirable rate, an entire shutdown of communication system B takes place.

Through investigation, it has been determined by the inventors that if a charge is removed during an overheat condition, the battery cells can be salvaged. However, if current is maintained as the temperature rises a thermal runaway and/or melt down situation will occur resulting in damage or complete destruction of the batteries. Remote shutdown sensor 38 is used to either sense ambient temperature of the entire battery configuration 14, or the temperature of an individual cell of the configuration. When it is determined by current controller 30 that the sensed value from sensor 38 is above an acceptable level further recharging current is stopped in order to remove charge from back-up battery configuration 14.

As previously discussed, during normal operation rectifier 10 supplies load 12. However, when rectifier 10 enters a reduced output or shutdown state back-up battery configuration 14 discharges current to load 12 in order to maintain desired operating levels. In existing telecommunication systems, the load will require 54 volts for normal operation. A fully charged back-up battery configuration 14, will discharge until it reaches a level of approximately 42 volts whereafter the telecommunication system shuts down to avoid further discharge which might otherwise damage the batteries.

When rectifier 10 is again brought back to a normal operating level, control system 28 operates to limit the recharging current for the back-up battery configuration 14 to avoid drawing excessive current that might result in damage to the batteries and which can also delay load 12 from receiving the power required for operation.

Figure 3A:
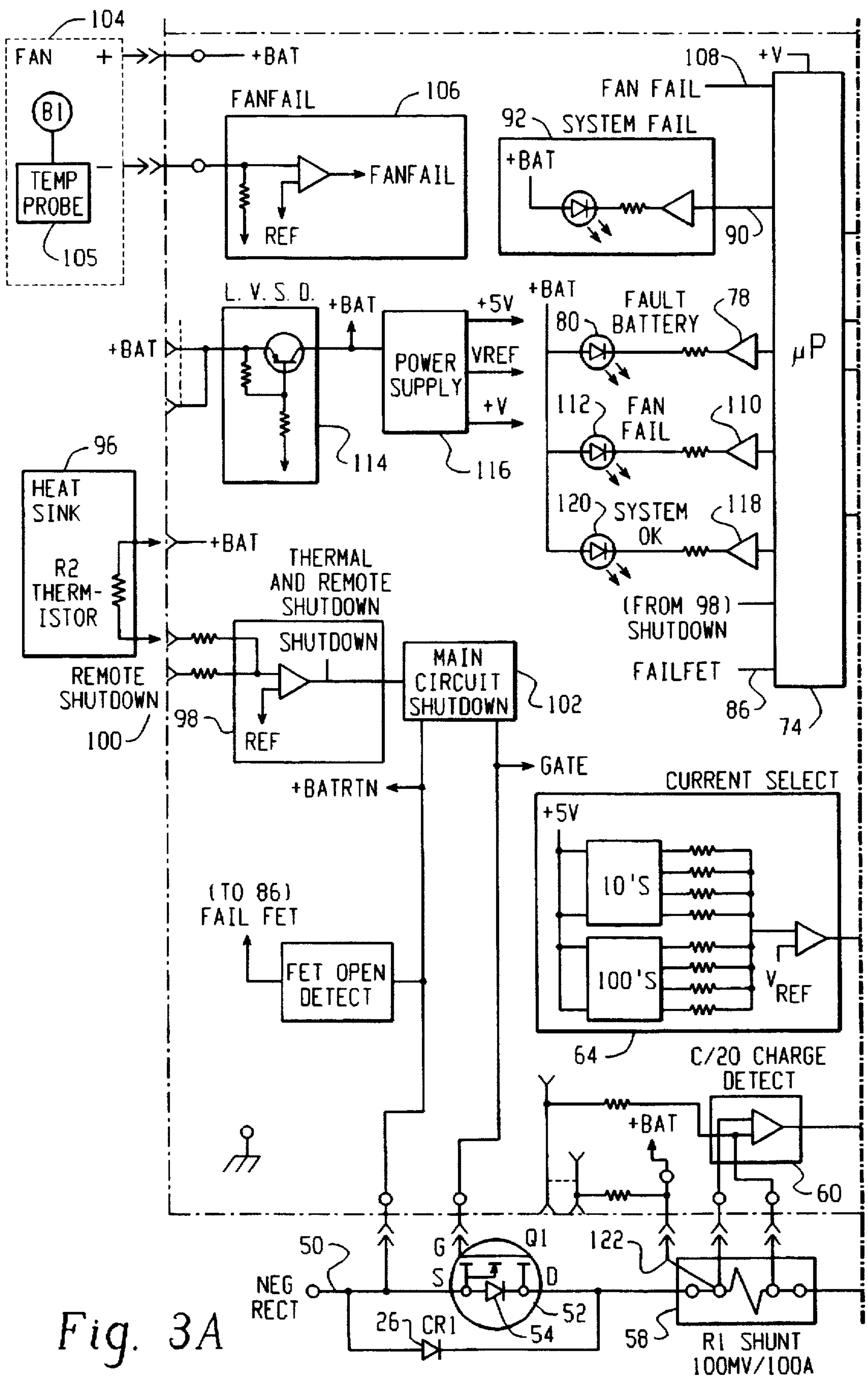
Figure 3B:
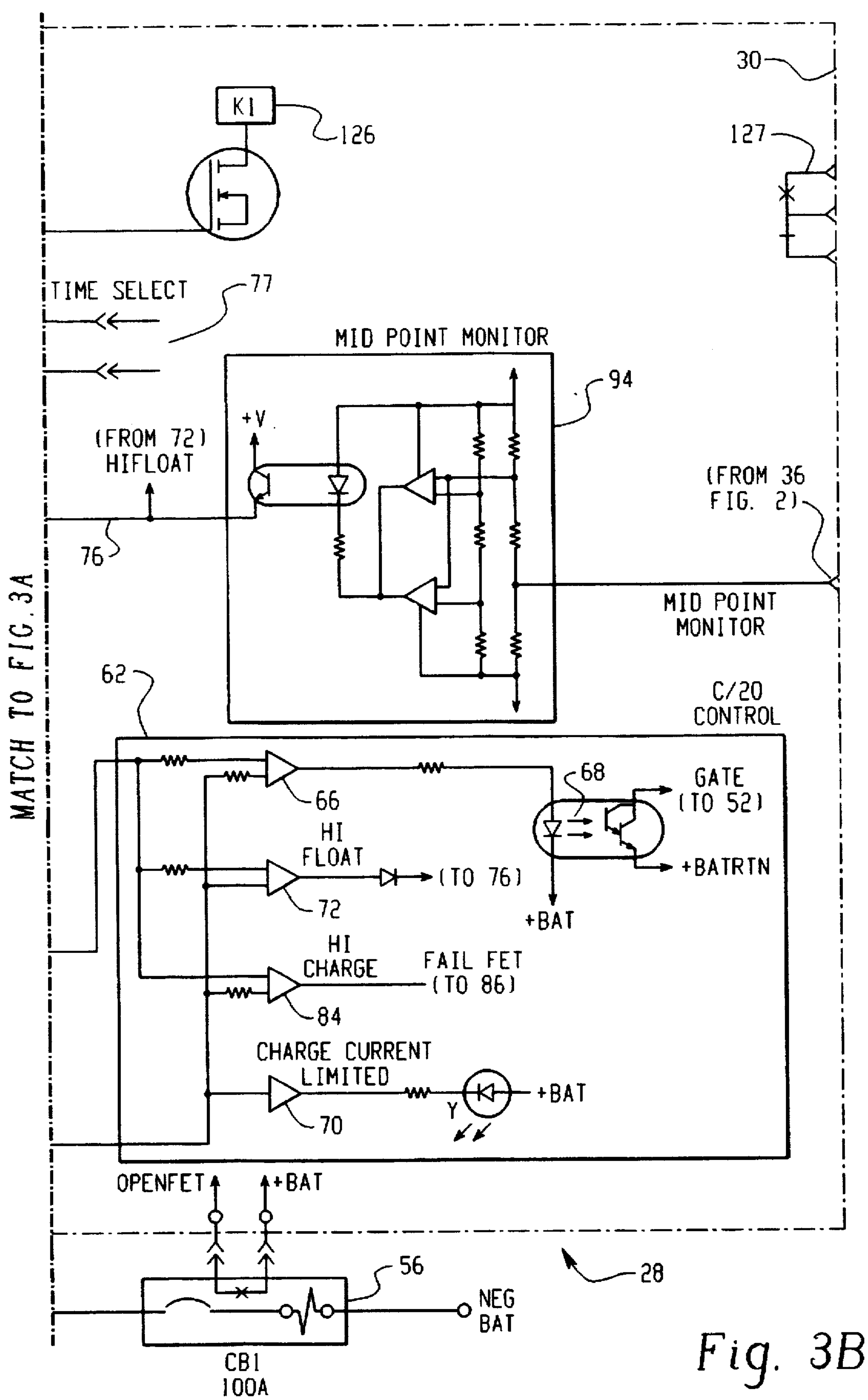

Turning attention to FIG. 3, a more detailed block diagram illustrating control system 28 including current controller 30 which may be implemented on a single printed circuit board.

Particularly, a recharge current flows through line 50 for recharging back-up battery configuration 14 of FIG. 2. It is noted that current flows in a forward direction or clockwise direction, as the charge to recharge back-up battery configuration 14 enters through a positive terminal of configuration 14. Field Effect Transistor (FET) 52 acts as a variable resistor similar to variable resistor 32, to limit the amount of current available for recharging. In addition to back-biased diode 26 which is not active in a forward direction, also provided is redundant diode 54. Diodes 26 and 54 are provided for redundancy should FET 52 fail. If this situation occurs during a time period when rectifier 10 is in a shutdown state these elements provide a path for discharging the back-up battery configuration 14 for use by load 12.

During extreme conditions, circuit breaker 56, which is a 100 amp circuit breaker, is provided to disconnect load 12 from the power supplied by rectifier 10.

With more specific attention to the control of current in the subject application, shunt 58 detects current in line 50 and passes this detected current to charge detector 60 which amplifies and forwards sensed values to inputs of current limit controller 62.

A current reference value is generated and output from current selection unit 64 to current limit controller 62, where it is compared with the output of charge detector 60. With attention to control of the current used to recharge the back-up battery configuration 14, the inputs from charge detector 60 and current selection unit 64 are compared in comparator 66 and output to optical coupler 68 which provides a signal to the gate of FET 52. In this arrangement, FET 52 is operated in a linear mode and controlled as a variable resistor limiting the amount of current available for recharging. Optical coupler 68 is used in this embodiment to isolate the inputs from the outputs of the circuit.

Prior to use of control system 28, it is possible for a user to select a current reference which corresponds to the value or size of the back-up battery configuration 14 for a specific installation. This is accomplished through the use of current selection unit 64 which allows the setting by an operator of reference currents appropriate for recharging of different sized battery configurations. In current selection unit 64 the reference value can be adjusted dependant upon the ampere-hour size of back-up battery configuration 14.

Also included within current controller 62 is buffer 70 which receives the amplified signal from charge detector 60 and passes it to an LED which visually indicates that a recharging operation is taking place.

In a system operating normally, following a recharging period a float current of a known desired value maintains the battery in a charged state. However, due to aging or for other reasons, batteries that have been recharged can maintain a float current that is of too high a value resulting in damage to the batteries. The subject invention monitors the float current to determine whether it is excessive. Following a predetermined time period an output from comparator 72 is provided to microprocessor 74 through input line 76. Time selection jumper inputs 77 are set to test the float current following a time interval which allows sufficient time for the recharging operation to have been completed. In the subject embodiment this time period can be set at either 36 or 48 hours, as applicants have determined that for a battery of C/20 these would be appropriate recharging periods. However, it is appreciated that other recharging periods may be more useful for different size batteries and, therefore, their testing time periods may vary.

More specifically to the high float testing, following a significant discharge of the batteries, microprocessor 74 begins the timing of either 36 or 48 hours at the expiration of which it will receive a signal from input 76 to determine whether a high float condition exists. If comparator 72 detects a high float condition, a faulty battery alarm is issued by microprocessor 74 to output 78 and faulty batter indicator 80 is illuminated allowing an operator or technician to be informed of the existence of a faulty battery situation.

It is noted that FET 52 may fail due to a short or open condition. In order to address a short situation, current controller 62 provides high charge detector 84 which compares the input reference current from current selector 64 and the amplified current from charge detector 60. The output of this comparison is provided to FET fail input 86 of microprocessor 74. Additionally, a FET open detector 88 is connected to sense the current flowing through line 50. When current is not detected in line 50 it is determined that FET 54 has failed in an open state and a signal representing this occurrence is provided to FET fail input 86 of microprocessor 74. Therefore, both the high charge signal from detector 84 which indicates a short of FET 52 and the open FET signal from FET open detector 88 are supplied to the FET fail input 86 of microprocessor 74. When a signal is received at fail FET input 86 a system fail signal is output on line 90 to system fail unit 92 which providing an indication that the system is in failure.

As previously noted in the discussion of FIG. 2, midpoint monitoring sensor 36 is included in control system 28. Signals from midpoint monitoring sensor 36 are provided to a midpoint monitor 94 which includes comparators arranged to determine whether both halves of the monitored back-up battery configuration 14 are within acceptable levels. The output of midpoint monitor 94 is provided to input 76 of microprocessor 74, which is the same input for signals from the high float comparator 72. Similar to high float comparator 72, the midpoint monitor signal is sensed by microprocessor 74 at predetermined time intervals, such as 36 or 48 hours in the present embodiment.

As also discussed in connection with FIG. 2, a main current shutdown arrangement is provided. Particularly, a temperature sensor such as heatsink sensor 96 mounted to an internal heatsink and will shut down control system 28 if the control system becomes to hot. The output from heatsink sensor 96 is passed to remote shutdown unit 98. Also provided to remote shutdown unit 98 is remote shutdown input 100. The outputs from remote shutdown unit 98 are included in control system 28 for situations where a dramatic shutdown of all system current is necessary. Signals from heatsink sensor 96 and remote shutdown 100 are supplied to remote shutdown unit 98 which compares the inputs to a reference signal and if the inputs are greater than the reference signal remote shutdown unit 98 issues a signal to activate main current shutdown unit 102. The output of main current shutdown unit 102 includes an input to the gate of FET 52 to place the gate in an off state, thereby shutting down the main current flow in line 50.

In addition to the above discussed elements, control system 28 includes a fan fail system wherein fan 104, internal to control system 28, has a temperature probe 105 connected thereto. As the temperature of control system 28 rises, fan 104 increases its speed to improve cooling. When fan 104 enters a fail state, a signal is provided to fan fail unit 106 which supplies a signal to fan fail input 108 of microprocessor 74. Based on this input, microprocessor 74 issues an alarm to output line 110 activating fan fail indicator 112, and the associated fan alarm shuts control system 28 down to keep control system 28 from failing.

Control system 28 also includes LVSD (Low Voltage Shut Down) 114 which detects low voltage being supplied to control system 28, indicating that battery configuration 14 is discharged to a very low point. LVSD acts to shut down control system to prevent further discharge and possible damage to the battery configuration.

When control system 28 is operating in a normal manner and there are no system failures, microprocessor 74 issues a system OK signal to output 118 to activate system OK indicator 120.

Power line 122 associated with shunt 58 is provided from the negative terminal of rectifier 10 illustrating that power does not go through the control lines of control system 28, the foregoing is true since the sensing used by control system 28 is quite low and would be disturbed by the power input. Relay coil is for system fail alarm and has single form-C contacts (127) as alarm outputs to a customer to control system 28.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A battery charge current limiter used in a circuit having a power supply supplying a load, and a back-up battery connected between the power supply and the load such that the back-up battery supplies power to the load at times when the power supply cannot fully supply the load, the battery charge current limiter comprising, a controller including, a first end connected to a main supply line which interconnects the power supply and the load, whereby the first end of the current controller is connected between the power supply and the load;

a second end connected to the back-up battery;

a variable resistance connected between the first end and the second end;

a current controller having a comparator for comparing a current reference signal and a signal representing the current being supplied to the back-up battery, connected to the variable resistance; and a secondary supply line connected from the back-up battery to the load;

wherein during normal operation the load is supplied by the power supply through the main supply line, wherein during reduced output by the power supply the load is supplied at least in part by the back-up battery through the secondary supply line, wherein the power supply recharges the back-up battery through the variable resistance, and wherein the current controller adjusts the variable resistance based on results of a comparison between the current reference signal and the signal representing the current being supplied to the back-up battery, such that during recharging of the back-up battery the current used to recharge the back-up battery is limited to a level whereby thermal runaway of the back-up battery is avoided.

2. The battery charge current limiter according to claim 1 further including a sensor system having a sensor placed in operational association with the back-up battery, wherein the sensor system acts to shut down current flow to the back-up battery when a predetermined situation is sensed.

3. The battery charge current limiter according to claim 2 wherein the sensor system is a thermal temperature sensor system, the sensor is a thermal temperature sensor, and the predetermined situation is an over-temperature situation.

4. The battery charge current limiter according to claim 1 wherein the back-up battery is a plurality of battery cells.

5. The battery charge current limiter according to claim 4 further including a midpoint monitor configured to monitor a midpoint of the back-up battery.

6. The battery charge current limiter according to claim 1 wherein the variable resistance is a linerally controlled field effect transistor, FET.

7. The battery charge current limiter according to claim 6 further including a FET fail monitor, configured to monitor the state of the FET.

8. The battery charge current limiter according to claim 7 further including a redundant secondary supply line which operates to allow a discharging of the back-up battery to the load when the secondary supply line is inoperative.

9. The battery charge current limiter according to claim 1 further including a remote shut down input, whereby a signal external of the current limiter is used to shut down the current limiter.

10. The battery charge current limiter according to claim 1 further including a current selection unit, whereby the current reference signal supplied to the current controller can be adjusted.

11. The battery charge current limiter according to claim 1 wherein the back-up battery is configured in a float condition.

12. In a system having a power supply which supplies a load, and a back-up battery interconnected between the power supply and the load and configured to supply the load at times when the load is not fully supplied by the power supply, a method for recharging the back-up battery comprising the steps of:

sensing the back-up battery requires recharging;

supplying a first portion of an output of the power supply of the load;

supply a second portion of the output of the power supply to the back-up battery;

determining the value of the first portion necessary to maintain the load sufficiently supplied for operation; and controlling the value of the second portion in order to maintain the value of the first portion at a level determined necessary for operation of the load, wherein at all times during recharging the load is sufficiently supplied for operation.

13. The method according to claim 12 wherein the step of sensing that the back-up battery requires recharging includes comparing a predetermined current reference signal with a signal representing the current being supplied to the back-up battery.

14. The method according to claim 12 further including a step of sensing a back-up battery float condition.

15. The method according to claim 12 further including the steps of, sensing a thermal battery overheat condition; and interrupting current flowing to the back-up battery.

16. The method according to claim 12 wherein the back-up battery is a plurality of battery cells and further including a step of monitoring a midpoint of the back-up battery.

17. The method according to claim 12 wherein the step of controlling includes adjusting a variable resistance to increase and decrease current flowing into the back-up battery during recharging.

18. The method according to claim 12 wherein the first portion of the power supply is current supplied to the load through a main supply line.

19. The method according to claim 12 further including a step of supplying a current from the back-up battery to the load through a secondary supply line by discharging current from the back-up battery when the load is not fully supplied by the power supply.

20. The method according to claim 12 further including a step of supplying a redundant discharge path from a back-up battery to the load.

21. The method according to claim 12, wherein the current controller is configured such that in a situation where a power supply transitions from a non-active to active state, current is supplied to the load at a value such that the load is substantially immediately supplied with sufficient current for operation.

22. A battery charge current limiter used in a circuit having a power supply supplying a load, and a back-up battery connected between the power supply and the load such that the back-up battery supplies power to the load at times when the power supply cannot fully supply the load, the battery charge current limiter comprising, a controller including, a first end connected to a main supply line which interconnects the power supply and the load, whereby the first end of the current controller is connected between the power supply and the load;

a second end connected to the back-up battery which is in a float condition;

a variable resistance connected between the first end and the second end;

a current sensor for sensing current supplied to the back-up battery;

a current reference signal generator, for generating a current reference signal;

a current controller having a comparator which compares current supplied to the back-up battery and the current reference signal, and being connected to the variable resistance; and a secondary supply line connected from the back-up battery to the load;

wherein during normal operation the load is supplied by the power supply through the main supply line, wherein during reduced output by the power supply the load is supplied by the power supply and by the back-up battery through the secondary supply line, wherein the power supply recharges the back-up battery through the variable resistance, and wherein the current controller adjusts the variable resistance such that during recharging of the back-up battery, current used to recharge the back-up battery is limited to a level based on the results of a comparison between the current reference signal and the current supplied to the back-up battery which allows the load to be operational during all of the recharging.

* * * * *